July 8, 1930. S. J. NORDSTROM Re. 17,724

VALVE

Original Filed Feb. 1, 1926 2 Sheets-Sheet 1

INVENTOR
Sven Johan Nordstrom
BY
Archibald Coy
ATTORNEY

July 8, 1930. S. J. NORDSTROM Re. 17,724

VALVE

Original Filed Feb. 1, 1926 2 Sheets-Sheet 2

INVENTOR
Sven Johan Nordstrom
BY
Archibald Cox
ATTORNEY

Reissued July 8, 1930 Re. 17,724

UNITED STATES PATENT OFFICE

SVEN JOHAN NORDSTROM, OF PIEDMONT, CALIFORNIA, ASSIGNOR TO MERCO-NORDSTROM VALVE COMPANY, OF SAN FRANCISCO, CALIFORNIA, A CORPORATION OF DELAWARE

VALVE

Original No. 1,634,721, dated July 5, 1927, Serial No. 85,119, filed February 1, 1926. Application for reissue filed June 24, 1929. Serial No. 373,418.

The invention relates to an improvement in valves, and more particularly to an improvement in plug valves of the type in which lubricant is used for the purpose of lubricating the bearing or seating surfaces of the valve.

One object of the present invention is to provide a plug valve of this type with improved means by which the pressure under which the plug is held against its seat may be made to vary from maximum when the plug is in closed position to minimum when the plug is in open position, the pressure at all times, however, being sufficient to hold the plug against its seat, except when the plug is lifted for the purpose of introducing fresh lubricant between the bearing or seating surfaces. A further object of the invention is to reduce the cost of manufacture of valves of this type. Another object of the invention is to provide plug valves with improved means whereby the valve will be prevented from leaking, especially outwardly. A further object of this invention is to devise a novel valve structure which will tend to prevent rotation of compressible packing, when the stem is rotated. A still further object of the invention is to provide a plug valve with means whereby the sealing packing may be renewed while the valve is in service with the plug in either open or closed position. These objects are accomplished in the improved plug valve hereinafter fully described and particularly pointed out in the appended claims.

Figure 1:
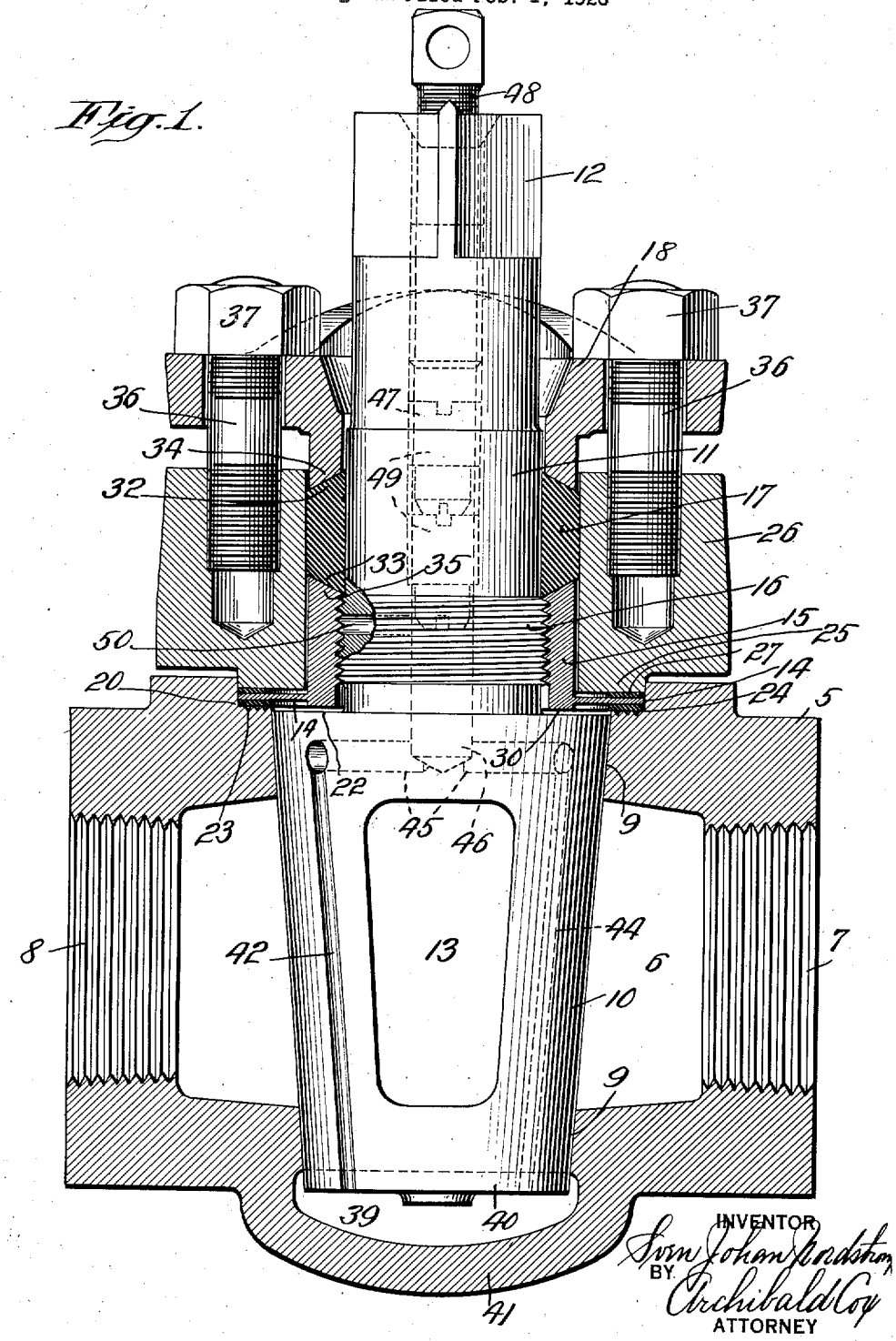
Figure 4:
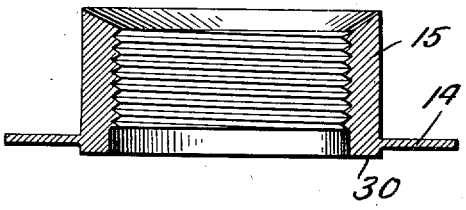
Figure 2:
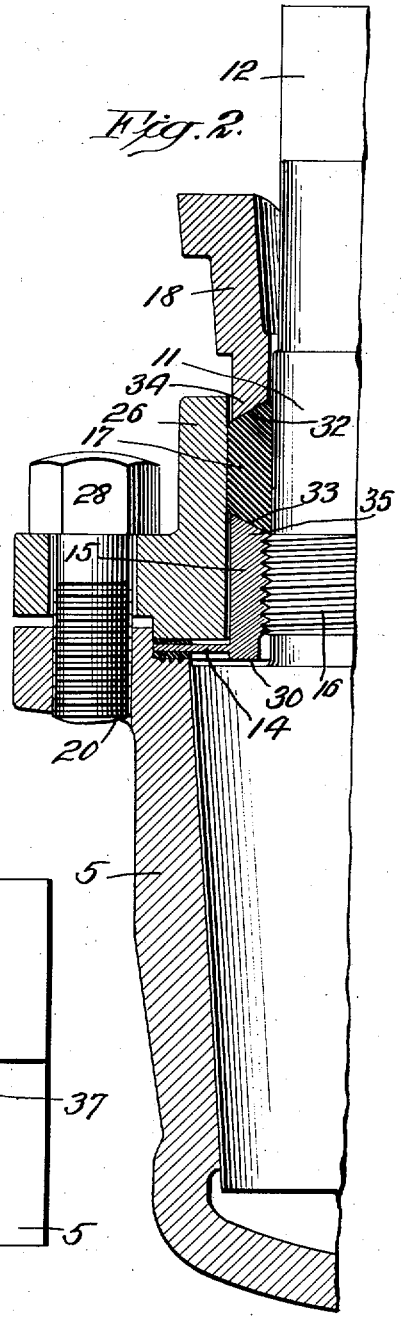
Figure 3:
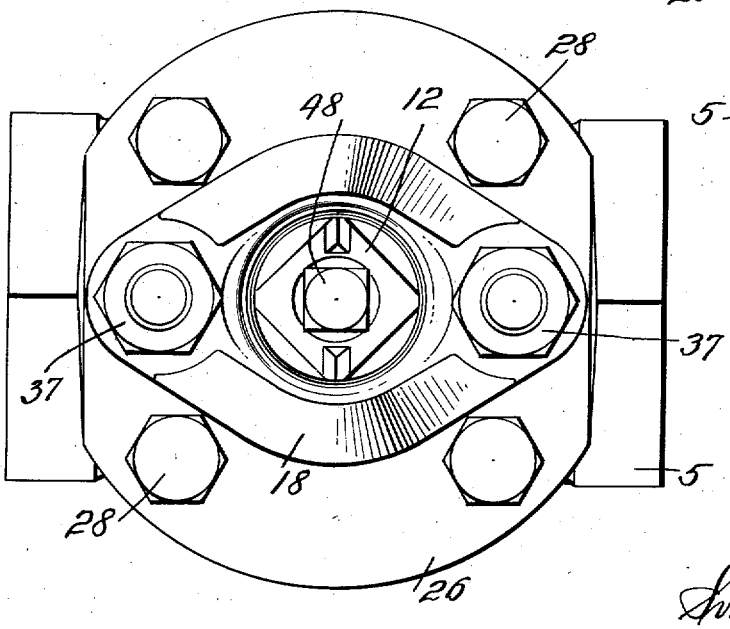

In the accompanying drawings illustrating the preferred form of the invention, Fig. 1 is a longitudinal section through the improved valve with the plug in closed position; Fig. 2 is a transverse section through the valve shown in Fig. 1, only one-half of the valve structure being shown; Fig. 3 is a top plan of the valve shown in Fig. 1; and Fig. 4 is a longitudinal section through the diaphragm and threaded collar.

The improved valve as illustrated in the drawings comprises the usual casing 5 provided with a longitudinal passageway 6 therethrough having an inlet 7 and an outlet 8. Formed transversely of the passageway 6 in the casing 4 is a valve seat or bore 9 which is preferably tapered and in which is seated a plug 10 having a valve stem 11 the outer end of which is squared at 12 to receive a wrench by which the plug may be turned to open and close the valve. In the plug 10 is a hole 13 adapted to register with the passageway 6 when the plug is turned to open position. The valve parts thus far described are of usual construction and mode of operation.

The means for holding the plug 10 firmly against its seat 9 comprises a flexible ring or diaphragm 14, a threaded collar 15 engaging with the threads 16 formed on the base of the valve stem 11 and a ring or collar of resilient packing 17 arranged to be adjustably compressed by means of the gland 18. The construction and mode of operation of these parts are such that the plug is held against its seat with greater force when it is in closed position than when it is in open position, but is at all times held against its seat with sufficient force to prevent the fluids from entering the joint between the plug 10 and the seat 9.

The diaphragm 14 is in the form of a ring located in an annular recess 20 formed in one side of the casing 5 around the larger end of the tapered valve seat 9. When the plug 10 is held firmly against its seat, as shown in Fig. 1, a slight space separates the top 22 of the plug from the bottom 23 of the recess 20, which space is availed of to secure the varying pressure with which the plug is held against its seat when it is in closed and open positions, as will presently be described. Interposed between the upper surface 23 of the recess 20 and the lower surface of the outer rim of the ring 14 is a narrow ring gasket 24, and interposed between the upper surface and the outer rim of the ring 14 and the lower surface of the hub part 25 of the valve cover 26 is a narrow ring gasket 27. The valve cover 26 is secured to the casing by means of the cap screws 28 and thereby tightly holds the ring 14 in the recess 20 and so prevents lateral or rotative movement thereof while permitting the inner edge or rim of the ring to travel longitudinally or axially of the valve stem 11.

The internally threaded collar 15 is integral with the inner edge of the flexible ring 14 and projects outwardly, surrounding the base of the valve stem 11. The collar 15 is loosely surrounded by the inner end of the annular valve cover 26. The inner end 30 of the collar 15 extends beyond the under surface of the ring 14 a distance substantially equal to the distance between the upper surface 22 of the plug and the bottom surface 23 of the recess 20, and this distance is substantially equal to one-fourth the pitch of the cooperating threads on the base of the valve stem and the collar 15. The result is that when the plug is turned in a counter-clockwise direction through an arc of 90° from its closed position, as shown in Fig. 1, to its open position with the hole 13 in alinement with the passageway 6 through the casing, the travel of the threads 16 on the stem 11 in the threads of the collar 15 will cause the collar 15 to move toward the plug and engage with the top surface 22 thereof when the plug reaches its open position. Thus the open position of the plug is determined by the engagement of the inner end of the collar 15 with the upper end of the plug.

The outer end of the valve cover 26 forms with the valve stem 11 an annular space in which the ring of resilient packing 17 is located. The outer end 32 of the packing ring 17 and the inner end 33 thereof are beveled and the inner end 34 of the gland 18 and the outer end 35 of the collar 15 are correspondingly beveled, so that as the packing 17 is compressed it fills the space between the stem 11 and the cover 26 and exerts its pressure on the outer end of the collar 15 to hold the plug 10 firmly against its seat 9. The gland 18 is of usual construction and is held in place on the cover 26 by means of the studs 36 and nuts 37. The amount of compression exerted on the packing 17 by the gland 18 may be regulated by turning the nuts 37 in the proper direction, in a clockwise direction to increase the compression and therefore the pressure exerted by the packing 17 on the collar 15, and in a counter-clockwise direction to decrease the compression and thereby lessen the pressure exerted by the packing 17 on the collar 15. By properly regulating the compression of the packing 17 the closed position of the plug 10 may be approximately determined. By turning the plug from its open to its closed position a few times and gradually tightening down on the nuts 37 so that when the plug reaches substantially its closed position considerable turning force is required to turn it completely into its closed position, the closed position of the plug is approximately determined. It will thus be understood that the open position of the plug is determined by the engagement between the inner end 30 of the collar 15 and the top surface of the plug and that the closed position of the plug is determined substantially positively by the adjustable compression of the packing 17. The operator readily perceives the fact that the plug is approximately in its closed position by the force required to turn the plug.

While the plug is being turned from its open to its closed position the travel of the threads 16 on the valve stem in the threads on the collar 15 causes the collar to move away from the larger end of the plug and toward the packing 17 thereby compressing the packing 17. The pressure exerted by the packing 17 upon the collar 15 is communicated to the threads 16 and so to the plug 10 to force the latter tightly against its seat 9 when the plug is turned to closed position. Under these conditions the packing 17 exerts its maximum pressure upon the plug 10. When the plug is turned from its closed to its open position the collar 15 moves from the packing 17 toward the upper end of the plug 10 and thereby lessens the compression upon the packing 17. Under these conditions the packing 17 exerts its minimum pressure upon the plug. It will be observed, however, that this pressure is sufficient to hold the plug firmly in its seat against any tendency the fluid passing through the line may have to lift the plug from its seat.

In this type of valve the contacting surfaces of the plug 10 and its seat 9, which are known as the bearing or seating surfaces of the valve, are normally held slightly separated by a thin film of lubricant which facilitates the turning of the plug and at the same time prevents foreign matter from lodging on the bearing surfaces. It is to be understood therefore that when the plug is described as held firmly against its seat, a thin film of lubricant under normal conditions of operation separates the adjacent surfaces of the plug and its valve seat. From time to time it is necessary to renew or increase this film of lubricant by slightly increasing the amount of separation between the plug and its seat and introducing a fresh supply of lubricant between them. In the present invention the plug is separated from its seat for the purpose of lubrication (the packing 17 yielding sufficiently) by putting pressure on the supply of lubricant introduced into the chamber 39 formed between the smaller end 40 of the plug 10 and the adjacent part 41 of the valve casing. The lubricant is introduced into the chamber 39 through two channels 42 and 44 formed longitudinally in the surface of the plug 10. The upper ends of the grooves or channels 42 and 44 communicate by the transverse hole 45 with the inner end 40 of a reservoir 47 formed axially in the valve stem 11. The outer end of the reservoir 47 is threaded to receive a screw 48 by which the lubricant in the reservoir may be put under pressure. This pressure being communicated to the lubricant in the chamber 39, thereby lifts the plug 10 from its seat and causes the lubricant in the grooves or channels 42 and 44 to ooze laterally therefrom so that when the plug is turned in either direction the excess lubricant is smeared as a thin film between the contacting, or more properly speaking, adjacent surfaces of the plug 10 and its seat 9. Backflow of lubricant through the reservoir 47 is prevented by the check valves 49 of usual construction and mode of operation.

The joint between the valve cover 26 and the casing 5 is hermetically sealed by means of the compression of the gaskets 24 and 27 by the cover 26. Leakage by way of the cooperating threads on the valve stem and collar 15 is prevented by means of the compression of the packing 17. Leakage through these parts is further prevented by introducing lubricant into them from the reservoir 47 through the radial hole 50 which passes through the threads 16 and the base of the valve stem into the inner end of the reservoir 47. The pressure under which the lubricant in the reservoir 47 is forced into the interstices between the cooperating threads on the stem 11 and on the collar 15 thereby effectively seals these passages against leakage. Thus it will be observed that the present invention provides a valve in which leakage from the valve outwardly is positively avoided. The sealing of the joint between the plug 10 and its seat 9 by a film of lubricant prevents leakage past the plug when it has been turned to closed position. The packing 17 will not tend to rotate together with the stem 12, since this packing has only a minor portion of its surface area in contact with the stem. Thus the outer periphery of packing 17 is pressed in contact with the stationary inner periphery of cover 26, and the upper and lower packing faces are in frictional contact with the normally stationary gland 18 and ring 15.

When the improved valve constructed as described above is assembled, the threaded collar 15 is screwed down on the threaded section 16 of the valve stem 11 until the inner end 30 of the collar 15 encounters the top surface 22 of the plug 10. The gasket 24 is then placed against the under surface of the outer rim of the flexible ring or diaphragm 14 and the gasket 27 is placed on the upper surface of the outer rim of the ring 14. The parts are then inserted into the valve casing 5 with the plug in open position, that is, with the hole 13 therein in alinement with the passageway 6 through the casing. Inasmuch as the ring or diaphragm 14 at this time is substantially straight and parallel with the top surface 22 of the plug which is in engagement with the inner end 30 of the collar 15, the plug 10 will be held raised from its seat until the packing 17 is in place and is put under pressure by means of the gland 18. Thereupon the plug 10 is forced into its seat, the flexibility of the ring or diaphragm 14 permitting this. Under these conditions the inner end 30 of the collar 15 is still in contact with the top surface 22 of the plug. The nuts 37 are then adjusted until the compression of the packing 17 is properly regulated to permit the plug 10 to be turned into approximately its closed position and no more. As the plug is turning from its open to its closed position, the inner end 30 of the collar 15 leaves the top surface 22 of the plug 10, as shown in Fig. 1, and so increases the pressure under which the plug is held against its seat.

I claim:

1. A valve comprising, a casing having a passageway therethrough, a plug seated in the casing and having a hole adapted to register with the passageway, one side of the casing being provided with an annular recess above the larger end of the plug, a flexible ring located within the recess, a cover adapted to be secured to the casing and to hold the outer rim of the ring tightly against the casing, an internally threaded collar mounted on the inner edge of the ring and extending outwardly, a stem projecting outwardly from the plug and having a threaded section engaged by the collar, means for adjustably exerting a yielding pressure on the outer end of the collar, and means for lifting the plug from its seat so that a film of lubricant may be spread between the plug and its seat.

2. A valve comprising, a casing having a passageway therethrough, a plug seated in the casing and having a hole adapted to register with the passageway, one side of the casing being provided with an annular recess above the larger end of the plug, a flexible ring seated in the recess, means for holding the outer edge of the ring tightly against the casing, an internally threaded collar mounted on the inner edge of the ring and extending outwardly, a stem projecting outwardly from the plug and having a threaded section engaged by the collar, a ring of flexible packing surrounding the stem and bearing upon the outer end of the collar, and means for compressing the packing to determine the closed position of the plug, the open position of the plug being determined by the engagement of the inner end of the collar with the upper surface of the plug.

3. A valve comprising, a casing having a passageway therethrough, a plug seated in the casing and having a hole adapted to register with the passageway, one side of the casing being provided with an annular recess above the larger end of the plug, a flexible ring located in the recess, a narrow ring gasket located between the outer rim of the flexible ring and the casing, a cover for the casing, a narrow ring gasket located between the cover and the upper surface of the outer rim of the flexible ring, an internally threaded collar mounted on the inner edge of the flexible ring, the inner end of the collar and the upper end of the plug determining the open position of the plug, a valve stem projecting outwardly from the larger end of the plug and having a threaded section engaged by the collar, and means for exerting a yielding pressure on the collar to determine the closed position of the plug.

4. A valve comprising, a casing having a passageway therethrough, a plug seated in the casing and having a hole adapted to register with the passageway, a valve stem projecting outwardly from the larger end of the plug having a threaded section, an internally threaded collar mounted on the threaded section of the stem, means for preventing the collar from rotating but permitting it to have a longitudinal movement axially of the valve stem, and means for exerting a yielding pressure longitudinally on the collar.

5. A valve comprising, a casing having a passageway therethrough, a plug seated in the casing, one side of the casing being provided with an annular recess, a flexible ring located within the recess, a cover for holding the outer edge of the ring tightly against the casing to prevent rotation thereof, a valve stem projecting from the larger end of the plug, the outer end of the cover surrounding the stem providing a space for packing, resilient packing in the space provided therefor, a collar supported by the flexible ring and interposed between the inner end of the packing and the larger end of the plug, means for exerting an adjustable pressure on the packing, cooperating threads on the collar and on the valve stem whereby the pressure exerted by the packing on the collar is increased or diminished according to the direction of rotation of the plug, and means for lifting the plug from its seat against the resilient packing so that the seating surfaces may be lubricated.

6. A valve comprising, a casing having a passageway therethrough, a plug seated in the casing, one side of the casing being provided with an annular recess, a flexible ring located within the recess, a cover for holding the outer edge of the ring tightly against the casing to prevent rotation thereof, a valve stem projecting from the larger end of the plug, the outer end of the cover surrounding the stem providing a space for packing, resilient packing in the space provided therefor, a collar supported from the flexible ring and interposed between the inner end of the packing and the larger end of the plug, means for exerting an adjustable pressure on the packing, cooperating threads on the collar and on the valve stem whereby the pressure exerted by the packing on the collar is increased or diminished according to the direction of rotation of the plug, means for lifting the plug from its seat against the resilient packing so that the seating surfaces may be lubricated, and means for lubricating the cooperating threads and the resilient packing.

7. A valve comprising, a casing having a passageway therethrough, a plug provided with a stem seated in the casing and having a hole adapted to register with the passageway, one side of said casing being provided with a recess through which the stem of the plug projects, a flexible ring positioned within the recess and held against rotation, a collar carried on the inner edge of said ring and surrounding the base of the valve stem, cooperating threads on the inner surface of the collar and on the base of the stem, a resilient packing bearing upon the outer end of the collar, and means for compressing the packing.

8. A valve comprising, a casing having a passageway therethrough, a plug seated in the casing and having a hole adapted to register with the passageway, a valve stem extending from the plug outwardly through the casing, said casing having an annular recess surrounding the base of the valve stem, an annular diaphragm located in the recess, means for holding the outer rim of the diaphragm firmly against the casing, a collar supported by the inner edge of the diaphragm and surrounding the base of the valve stem, cooperating threads on the collar and the valve stem, and resilient means for exerting pressure on the collar to hold the plug against its seat, there being sufficient play between the bottom of the collar and the top of the plug to permit the plug to be turned from closed position through a predetermined arc to open position.

9. A valve comprising a casing or body having a passageway therethrough, a plug rotatably disposed within the casing and having a hole adapted to register with the passageway, a member extending into the casing axially of the plug and operably connected to the same whereby the plug can be turned by rotation of the member, said member having a threaded portion, means sealed with respect to the casing and having a threaded engagement with the threaded portion of said member, and common means to supply lubricant under pressure to the valve working surfaces and to said threaded engagement for sealing the latter against leakage.

10. A valve comprising a casing or body having a passageway therethrough, a plug rotatably disposed within the casing and having a hole adapted to register with the passageway, a member extending into the casing axially of the plug and operably connected to the same whereby the plug can be turned by rotation of the member, said member having a threaded portion, a collar internally threaded and engaging the threads of said member, means for supplying lubricant to said threaded engagement, and means for sealing said collar relative to the casing, said last named means permitting relative movement between the collar and casing upon rotation of said member.

11. A valve comprising a casing or body having a passageway therethrough, a plug rotatably disposed within the casing and having a hole adapted to register with the passageway, one side of the casing being provided with a recess adjacent one end of the plug, a flexible ring or diaphragm located within the recess, means for sealing the outer rim of the ring with respect to the casing, an internally threaded collar mounted on the inner edge of the ring, and a member rotatable for turning the plug, said member having a threaded portion engaged by the threads of the collar.

12. A valve comprising a casing or body having a passageway therethrough, a plug rotatably disposed within the casing and having a hole adapted to register with the passageway, one side of the casing being provided with a recess adjacent one end of the plug, a flexible ring or diaphragm located within the recess, means for sealing the outer rim of the ring with respect to the casing, an internally threaded collar mounted on the inner edge of the ring, a member rotatable for turning the plug and having a threaded portion engaged by the threads of the collar, and means for supplying lubricant to said threaded engagement.

In witness whereof, I have hereunto set my hand.

SVEN JOHAN NORDSTROM.